United States Patent [19]

Hiles

[11] Patent Number: 4,629,268
[45] Date of Patent: Dec. 16, 1986

[54] TRAILER ELECTRICAL CONNECTOR

[75] Inventor: James W. Hiles, Tuttle, Okla.

[73] Assignee: Del City Wire Co., Inc., Oklahoma City, Okla.

[21] Appl. No.: 830,343

[22] Filed: Feb. 18, 1986

[51] Int. Cl.⁴ .............................................. H01R 13/44
[52] U.S. Cl. ................................ 339/44 M; 339/59 M; 339/36
[58] Field of Search ........................... 339/36–44 R, 339/44 M, 59 R, 59 M

[56] References Cited

U.S. PATENT DOCUMENTS

| | | | |
|---|---|---|---|
| 3,466,453 | 9/1969 | Greenberg | 339/44 M |
| 4,312,553 | 1/1982 | Lyckesjö | 339/44 M |
| 4,575,169 | 3/1986 | Duplatre et al. | 339/44 M |

Primary Examiner—Gil Weidenfeld
Assistant Examiner—Paula A. Austin
Attorney, Agent, or Firm—Laney, Dougherty, Hessin & Beavers

[57] ABSTRACT

An electrical connector for use with trailer apparatus which consists of a connector body unitarily molded from resilient plastic material to contain the standard four-connector array of power contacts while having the capability of being force-fit and retained within such as a bumper knock-out orifice of a towing vehicle.

7 Claims, 3 Drawing Figures

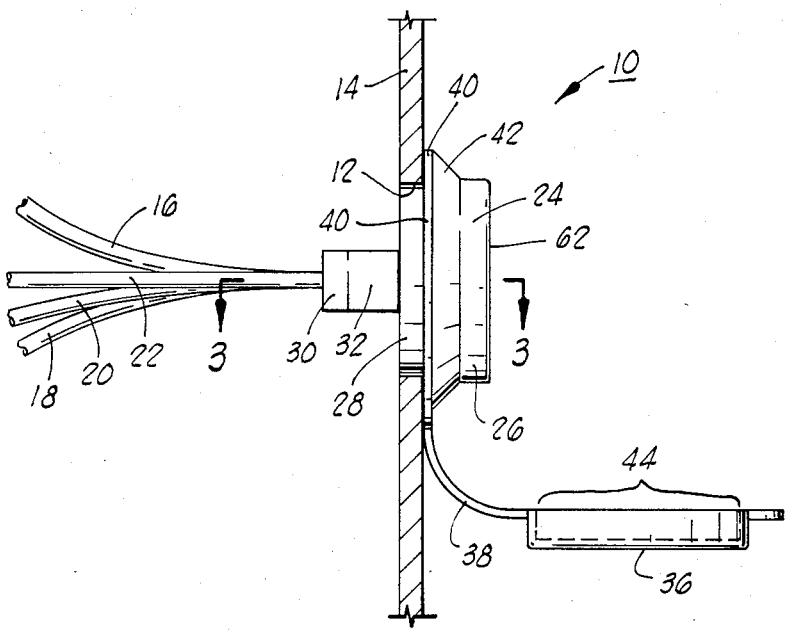
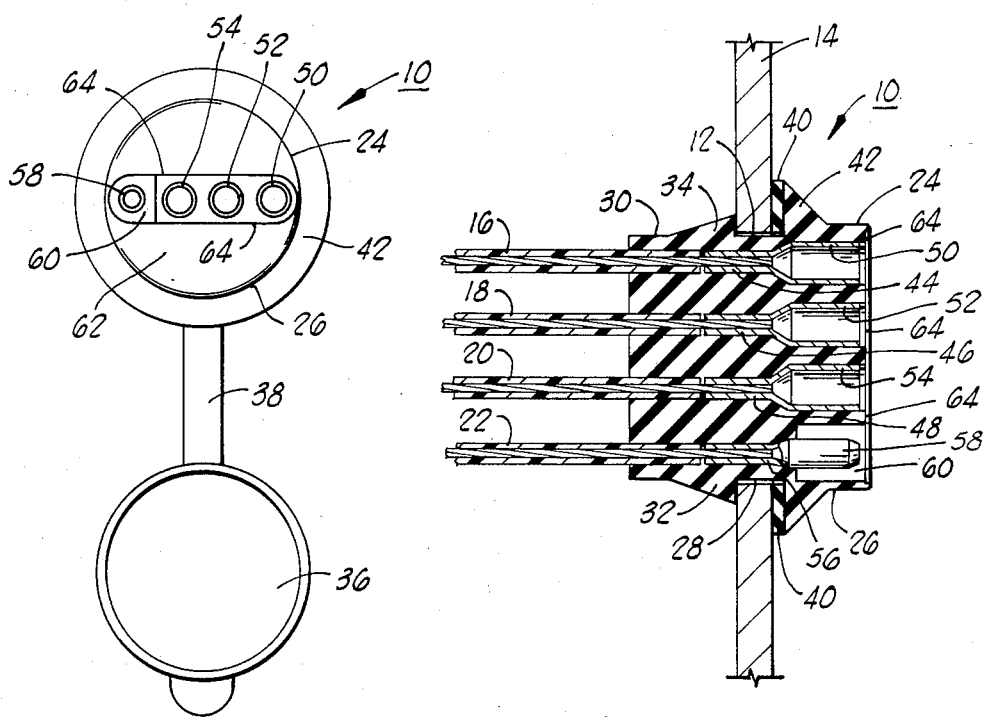

TRAILER ELECTRICAL CONNECTOR

BACKGROUND OF THE INVENTION

1. Field of the Invention

The invention relates generally to exterior electrical connector assemblies and, more particularly, but not by way of limitation, it relates to an improved weatherproof connector receptacle that may be readily installed in a bumper knock-out orifice or the like for connection to the electrical input plug of a trailer apparatus.

2. Description of the Prior Art

The prior art includes such as a standard form, four-conductor connector assembly that has been in general use for electrical connection of trailers for a considerable period of time. These are standard forms of four-connector receptacle wherein three female contacts provide connection for the energized or hot wires leading from the vehicle power system for connection to the trailer apparatus to provide D-C energization for the brake lights and left and right turn lights. A fourth connector, a recessed male receptacle provides the ground connection. Similarly, a mating plug from the trailer assembly provides three male lugs in line with a female lug to provide the interactive connection. In operation, a simple plug connection is made and the multiple wires are then taped or tied up out of interfering position, and no specific provision has been made in the prior art for proper retentive positioning of the connector assembly when the trailer apparatus is attached thereby to assure continued safe connection and reliability.

SUMMARY OF THE INVENTION

The present invention relates to improvements in connector assemblies for use with trailer apparatus having slaved or remotely powered electrical systems. The trailer may still utilize the standard, elongated in-line connector, three male and one female, but the connector assembly as used on the master vehicle is unitarily molded into a body that is readily inserted and retained in bumper knock-out holes or other attached bracket plates having an attachment hole of the requisite size. The connector component includes three female lugs and one male lug each attached as by crimping to a respective insulated connector wire, and these lugs are then molded in alignment within a unitary, resilient connector body to define a front face exposing entry to the lug contacts as well as a peripherally grooved mid-portion that may be force-fit into a receiving orifice to provide retentive positioning of the connector component. A resilient cap member suitable for retentive coverage of the front face is also connected by a strap and unitarily formed circular ring that is captively retained about the receiving orifice.

Therefore, it is an object of the present invention to provide an improved trailer connector component that may be permanently retained in associated vehicle bumper structure in non-interfering relationship.

It is also an object of the present invention to provide a trailer connector component that is relatively weathertight and can be covered in the non-use position.

It is yet another object of the invention to provide a trailer connector for co-action with a standard bumper knock-out orifice.

Finally, it is an object of the present invention to provide a standardized electrical connection to a trailer apparatus through a unitarily molded connector component that may be readily secured in or around rear bumper structure of a towing vehicle.

Other objects and advantages of the invention will be evident from the following detailed description when read in conjunction with the accompanying drawings which illustrate the invention.

BRIEF DESCRIPTION OF THE DRAWINGS

FIG. 1 is a side view in elevation of the present invention with supporting structure shown in section;

FIG. 2 is a view in elevation of the open face of the invention; and

FIG. 3 is a view in horizontal cross-section of the connector component as shown in FIG. 1.

DETAILED DESCRIPTION OF THE INVENTION

Referring to FIG. 1, a connector 10 is shown in operative position within such as a knock-out hole 12 in a bumper 14. In the event that connector 10 is used with other than a vehicle having a rear bumper knock-out hole, then a suitable bracket plate secured about the bumper supports and providing a hole 12 will suffice. Connector 10 provides output interconnection of system power from the master vehicle on leads 16, 18 and 20, i.e. for such as the brake and left and right tail lights on a trailer apparatus, and a common or ground connection is provided via lead 22.

Referring also to FIGS. 2 and 3, the connector 10 is a unitarily molded body 24 having a front portion 26, generally circular mid-portion 28 and a rear portion 30. Rear portion 30 is a generally flat portion as compared with the round mid-portion 28 and front portion 26, and rear portion 30 includes oppositely disposed tabs 32 and 34 which are formed to extend a diametric measure slightly larger than the diameter of the knock-out hole 12. Thus, as connector 10 is forced through bumper 14, tabs 32 and 34 snap outward to retain the connector 10 securely in place.

A protective cap member 36, also formed of a resilient material, is affixed on a strap 38 that is further formed into a retention ring 40 that may be loosely received over circular mid-portion 38 and captively retained between bumper 14 and an angular front collar 42 that is formed on front portion 26 of body 24. The diameter 44 of cap 36 is sized for force-fit retention of cap 36 over front portion 26 of connector 10 when in the non-connected attitude. Each of the connector body 24 and the cap 36 with strap and ring 40 may be molded by conventional injection molding techniques using rubber-like plastic material, e.g. Apex Number 1009 Black as procured from Peknor Apex Company, Pawtucket, R.I.

Referring more particularly to FIG. 3, the electrical connection provided is one of standard form, i.e. an aligned interconnection with three hot leads 16, 18 and 20 and a ground lead 22. Each of the hot leads 16, 18 and 20 is trimmed of insulation, inserted and then crimped, soldered or otherwise secured within a respective barrel 44, 46 or 48 of respective female lugs 50, 52 and 54. Thus, no hot connection is exposed for possible contact when connector 10 is in the disconnected attitude. The ground wire 22 is trimmed and secured within a barrel 56 of a male lug 58. The molding process is then carried out to form connector 10 with body 24 enclosing each of receptacles 50, 52 and 54 in equally spaced alignment, and with further alignment of male lug 58. In the molding, a connector void 60 is formed to allow connecting access of a mating female plug part when connector 10 is in the connected attitude.

The front portion 26 of connector 10 is formed with a front face 62 that lies on a plane that is forward of and closely adjacent the ends of lugs 50, 52, 54 and 58, and an indentation 64 (FIG. 2) of elongate configuration is formed around the lugs to provide a mating recess for a standard form trailer connector. The indentation 64 surrounding the contact points serves to make the connector weatherproof when in the connected attitude. Deeper indentation and more positive interconnection could be included, but it is deemed unnecessary in view of the low D-C voltages to be encountered.

In operation, the four-conductor trailer connector 10 can be forced through a 1¼ inch knock-out as are generally available on pickup truck bumpers. On certain other vehicles, a bracket plate with insertion hole may be suitably secured on a bumper support. Connector 10 is force-fit through the hole as connector tabs 32 and 34 retain the connector 10 in position. A cap 36 and ring 40 are also retained between front collar 42 and bumper 14 so that the cover or cap 36 can be placed over body face 62 for protective purposes when connector 10 is not in use. The connector 10 is formed to expose the standard four-conductor configuration and any of numerous trailer connectors can be utilized in combination. One well-known standard trailer connector of oval configuration is formed to fit within body face indentation 64 thereby to provide a more weatherproof connection to preserve integrity of electrical contact.

The foregoing discloses a novel improvement in trailer connectors that can be mounted through a bumper knock-out or associated mounting bracket thereby to eliminate unsightly hanging of wires and connectors under the vehicle bumper line while also providing an easy connect/disconnect position that eliminates possibilities of breakage of wires through bending fatigue or snagging on obstacles. The connector assembly is relatively unbreakable and totally resistant to corrosion and other oxidation effects. When not in use for trailer power interconnection, the assembly is fitted with a cap or cover that can be placed over the body face and lug contacts to provide protection against dust and road grime.

Changes may be made in combination and arrangement of elements is heretofore set forth in the specification and shown in the drawings; it being understood that changes may be made in the embodiments disclosed without departing from the spirit and scope of the invention as defined in the following claims.

What is claimed is:

1. A connector for retention in a bumper knock-out orifice to provide an electrical connection to a trailer apparatus, comprising:

plural lug members positioned in spaced alignment for inclusion as a group, each having an inner and an outer end;

plural insulated connector wires secured to respective plural lug member inner ends;

body means of unitarily molded formation for encapsulating said plural lug member group, said body means including a body front face that is essentially parallel to the plane of lug member outer ends and forming plural orifices for communication of said lug members to the exterior, and said body means including a mid-portion that has a periphery adapted for force-fit retention in said orifice; and cap means to be removably secured over said body means front face and being retained by a strap and ring portion that is retentively affixed around said body means mid-portion.

2. A connector as set forth in claim 1 wherein said body means mid-portion further comprises:

a generally circular peripheral portion having diameter for insertion and positioning within said knockout orifice;

a peripheral shoulder formed adjacent said circular peripheral portion proximate the body front face for retentive positioning adjacent said bumper orifice; and at least one radial retaining tab extending radially out from said circular peripheral portion for force-fit insertion through said knock-out orifice.

3. A connector as set forth in claim 1 wherein said plural lug members comprise:

three female lug contacts with inner end barrels crimped to a respective insulated wire and terminating closely adjacent said body from face, said lug contacts being aligned in equal spacing; and one male lug contact crimped to a respective insulated wire and terminating closely adjacent said body face, said lug contact being aligned with said female lug contacts in equal spacing.

4. A connector as set forth in claim 3 which is further characterized in that:

said body front face is formed with an elongated indentation enclosing each of said equally spaced lug contacts to provide a more weathertight connection with a mating plug connector.

5. A connector as set forth in claim 1 wherein said body means further comprises:

a body of revolution that forms a front portion defining said front face and including an enlarged diameter portion extending concentrically outward to form a front collar, and that further forms a reduced diameter mid-portion for reception within said orifice, and that still further includes a diametrically disposed rear portion that extends at least one retaining tab radially outward to define a diameter greater than that of said orifice.

6. A connector as set forth in claim 5 wherein:

said cap measuring portion is received on said reduced diameter mid-portion adjacent said front collar.

7. A connector as set forth in claim 5 wherein said plural lug members comprise:

three female lug contacts crimped to a respective insulated wire and terminating closely adjacent said body face, said lug contacts being aligned in equal spacing; and one male lug contact crimped to a respective insulated wire and terminating closely adjacent said body face, said lug contact being aligned with said female lug contacts in equal spacing.

* * * * *